US006489259B2

(12) United States Patent
LaBarge et al.

(10) Patent No.: US 6,489,259 B2
(45) Date of Patent: Dec. 3, 2002

(54) MIXED ZEOLITE $NO_X$ CATALYST

(75) Inventors: William J. LaBarge, Bay City, MI (US); Mark Hemingway, Columbiaville, MI (US); Joachim Kupe, Davisburg, MI (US); Galen B. Fisher, Bloomfield Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 49 days.

(21) Appl. No.: 09/751,928

(22) Filed: Dec. 29, 2000

(65) Prior Publication Data

US 2002/0086793 A1 Jul. 4, 2002

(51) Int. Cl.[7] .................................................. B01J 29/06
(52) U.S. Cl. ....................................................... 502/64
(58) Field of Search .............................. 502/60, 64, 66, 502/67, 71, 74, 77, 79; 423/213.2, 213.5, 219, 239.2, 245.3

(56) References Cited

U.S. PATENT DOCUMENTS

| | | | | |
|---|---|---|---|---|
| 4,699,892 A | * | 10/1987 | Suzuki | ........................... 502/4 |
| 5,173,278 A | * | 12/1992 | Marler et al. | ................ 423/239 |
| 5,174,888 A | * | 12/1992 | Kresge et al. | ................. 208/46 |
| 5,518,976 A | * | 5/1996 | Itoh et al. | ...................... 502/66 |
| 5,972,828 A | | 10/1999 | Doi et al. | |
| 6,004,896 A | * | 12/1999 | Addiego | ....................... 502/64 |
| 6,126,912 A | * | 10/2000 | Bourges et al. | ........... 423/239.1 |
| 6,214,303 B1 | * | 4/2001 | Hoke et al. | .................. 423/210 |

FOREIGN PATENT DOCUMENTS

WO     WO 94/27709     12/1994

* cited by examiner

Primary Examiner—Stanley S. Silverman
Assistant Examiner—Edward M. Johnson
(74) Attorney, Agent, or Firm—Vincent A. Cichosz

(57) ABSTRACT

A multiple zeolite catalyst mixture for purifying exhaust gases from an internal combustion engine, comprising: a first $NO_2$ to $N_2$ to conversion catalyst component; a second $O_3$ conversion catalyst component; a third HC conversion catalyst component; a fourth $N_2O$ decomposition catalyst component; and, a fifth VOC reduction catalyst component; wherein the catalyst component mixture includes about 50 to 75 weight percent of the first and second catalyst components, and about 25 to 50 weight percent of the third, fourth, and fifth catalyst components.

32 Claims, No Drawings

MIXED ZEOLITE NO$_x$ CATALYST

BACKGROUND OF THE INVENTION

The present invention relates to a catalyst for purifying exhaust gases from an internal combustion engine. In particular, it relates to a NO$_x$ catalyst.

It is well known in the art to use catalyst compositions, including those commonly referred to as three-way conversion catalysts ("TWC catalysts") to treat the exhaust gases of internal combustion engines. Such catalysts, containing precious metals like platinum, palladium, and rhodium, have been found both to successfully promote the oxidation of unburned hydrocarbons (HC) and carbon monoxide (CO) and to promote the reduction of nitrogen oxides (NO$_x$) in exhaust gas, provided that the engine is operated around balanced stoichiometry for combustion ("combustion stoichiometry"; i.e., between about 14.7 and 14.4 air/fuel (A/F) ratio).

However, fuel economy and global carbon dioxide (CO$_2$) emissions have made it desirable to operate engines under lean-burn conditions, where the air-to-fuel ratio is somewhat greater than combustion stoichiometry to realize a benefit in fuel economy. Diesel and lean-burn gasoline engines generally operate under highly oxidizing conditions (i.e., using much more air than is necessary to burn the fuel), typically at air/fuel ratios greater than 14.7 and generally between 19 and 35. Under these highly lean conditions, typical three-way catalysts exhibit little activity toward NO$_x$ reduction, as their reduction activity is suppressed by the presence of excess oxygen.

The control of NO$_x$ emissions from vehicles is a worldwide environmental problem. Lean-burn, high air-to-fuel ratio, and diesel engines are certain to become more important in meeting the mandated fuel economy requirements of next-generation vehicles. Development of an effective and durable catalyst for controlling NO$_x$ emissions under net oxidizing conditions accordingly is critical.

Recently, copper-ion exchanged zeolite catalysts have been shown to be active for selective reduction of NO$_x$ by hydrocarbons in the presence of excess oxygen. Platinum-ion exchanged zeolite catalyst is also known to be active for NO$_x$ reduction by hydrocarbons under lean conditions. However, this catalytic activity is significant only in a narrow temperature range around the lightoff temperature of hydrocarbon oxidation. All the known lean-NO$_x$ catalysts reported in the literature tend to lose their catalytic activity for NO$_x$ reduction when the catalyst temperature reaches well above the lightoff temperature of hydrocarbon oxidation. This narrow temperature window of the lean-NO$_x$ catalysts is considered to be one of the major technical obstacles, because it makes practical application of these catalysts difficult for lean-burn gasoline or diesel engines.). As an example, the Cu-zeolite catalysts deactivate irreversibly if a certain temperature is exceeded. Catalyst deactivation is accelerated by the presence of water vapor in the stream and water vapor suppresses the NO reduction activity even at lower temperatures. Also, sulfate formation at active catalyst sites and on catalyst support materials causes deactivation. Practical lean-NO$_x$ catalysts must overcome all three problems simultaneously before they can be considered for commercial use. In the case of sulfur poisoning, some gasoline can contain up to 1200 ppm of organo-sulfur compounds. Lean-NO$_x$ catalysts promote the conversion of such compounds to SO$_2$ and SO$_3$ during combustion. Such SO$_2$ will adsorb onto the precious metal sites at temperatures below 300° C. and thereby inhibits the catalytic conversions of CO, C$_x$H$_y$ (hydrocarbons) and NO$_x$. At higher temperatures with an Al$_2$O$_3$ catalyst carrier, SO$_2$ is converted to SO$_3$ to form a large-volume, low-density material, Al$_2$(SO$_4$)$_3$, that alters the catalyst surface area and leads to deactivation. In the prior art, the primary solution to this problem has been to use fuels with low sulfur contents.

Another alternative is to use catalysts that selectively reduce NO$_x$ in the presence of a co-reductant, e.g., selective catalytic reduction (SCR) using ammonia or urea as a co-reductant. Selective catalytic reduction is based on the reaction of NO with hydrocarbon species activated on the catalyst surface and the subsequent reduction of NO$_x$ to N$_2$. More than fifty such SCR catalysts are conventionally known to exist. These include a wide assortment of catalysts, some containing base metals or precious metals that provide high activity. Unfortunately, just solving the problem of catalyst activity in an oxygen-rich environment is not enough for practical applications. Like most heterogeneous catalytic processes, the SCR process is susceptible to chemical and/or thermal deactivation. Many lean-NO$_x$ catalysts are too susceptible to high temperatures, water vapor and sulfur poisoning (from SO$_x$).

Yet another viable alternative involves using co-existing hydrocarbons in the exhaust of mobile lean-burn gasoline engines as a co-reductant and is a more practical, cost-effective, and environmentally sound approach. The search for effective and durable non-selective catalytic reduction "NSCR" catalysts that work with hydrocarbon co-reductant in oxygen-rich environments is a high-priority issue in emissions control and the subject of intense investigations by automobile and catalyst companies, and universities, throughout the world.

A leading catalytic technology for removal of NO$_x$ from lean-burn engine exhausts involves NO$_x$ storage and reduction catalysis, commonly called the "lean-NO$_x$ trap". The lean-NO$_x$ trap technology can involve the catalytic oxidation of NO to NO$_2$ by catalytic metal components effective for such oxidation, such as precious metals. However, in the lean NO$_x$ trap, the formation of NO$_2$ is followed by the formation of a nitrate when the NO$_2$ is adsorbed onto the catalyst surface. The NO$_2$ is thus "trapped", i.e., stored, on the catalyst surface in the nitrate form and subsequently decomposed by periodically operating the system under stoichiometrically fuel-rich combustion conditions that effect a reduction of the released NO$_x$ (nitrate) to N$_2$.

The lean-NO$_x$-trap technology has been limited to use for low sulfur fuels because catalysts that are active for converting NO to NO$_2$ are also active in converting SO$_2$ to SO$_3$. Lean NO$_x$ trap catalysts have shown serious deactivation in the presence of SO$_x$ because, under oxygen-rich conditions, SO$_x$ adsorbs more strongly on NO$_2$ adsorption sites than NO$_2$, and the adsorbed SO$_x$ does not desorb altogether even under fuel-rich conditions. Such presence of SO$_3$ leads to the formation of sulfuric acid and sulfates that increase the particulates in the exhaust and poison the active sites on the catalyst. Attempts with limited success to solve such a problem have encompassed the use of selective SO$_x$ adsorbents upstream of lean NO$_x$ trap adsorbents. Furthermore, catalytic oxidation of NO to NO$_2$ is limited in its temperature range. Oxidation of NO to NO$_2$ by a conventional Pt-based catalyst maximizes at about 250° C. and loses its efficiency below about 100 degrees and above about 400 degrees. Thus, the search continues in the development of systems that improve lean NO$_x$ technology with respect to temperature and sulfur considerations.

Another NO$_x$ removal technique comprises a non-thermal plasma gas treatment of NO to produce NO$_2$ which is then combined with catalytic storage reduction treatment, e.g., a lean $NO_x$ catalyst, to enhance $NO_x$ reduction in oxygen-rich vehicle engine exhausts. In lean $NO_x$, the $NO_2$ from the plasma treatment is adsorbed on a nitrate-forming material, such as an alkali material, and stored as a nitrate. By using a plasma, the lean $NO_x$ catalyst can be implemented with known $NO_x$ adsorbers, and the catalyst may contain less or essentially no precious metals, such as Pt, Pd and Rh, for reduction of the nitrate to $N_2$. Accordingly, an advantage is that a method for $NO_x$ emission reduction is provided that is inexpensive and reliable. The plasma-assisted lean $NO_x$ trap can allow the life of precious metal lean $NO_x$ trap catalysts to be extended for relatively inexpensive compliance to $NO_x$ emission reduction laws. Furthermore, not only does the plasma-assisted lean $NO_x$ trap process improve the activity, durability, and temperature window of lean $NO_x$ trap catalysts, but it allows the combustion of fuels containing relatively high sulfur contents with a concomitant reduction of $NO_x$, particularly in an oxygen-rich vehicular environment.

The exhaust of a spark ignited stoichiometric engine is relatively simple, small amounts of $C_6$ or less hydrocarbons, mostly methane, CO and $NO_x$. Thus "three-way" refers to the three exhaust components HC, CO and $NO_x$. There is little particulate mass and the sulfur passes through as $SO_2$.

By comparison a diesel exhaust is far more complex. There are great quantities of particulate mass, sulfate aerosols as sulfuric acid, larger ($C_{20}$ and greater) heavy hydrocarbons, a soluble oil fraction, and large quantities of carbon monoxide, nitrous oxide, nitric oxide, nitrogen dioxide, and partially oxidized hydrocarbons of all types. Additionally supplemental post fuel injection may be used to increase reducing agent in the exhaust stream. Diesel catalysts have to be complex enough to deal with all the different species present.

A diesel catalyst formulator is faced with three basic problems. First, $NO_x$ is attracted to hydrophilic materials, but the HC reducing agent is not. Second, HC reducing agent is attracted to hydrophobic materials, but $NO_x$ is not. Third, aluminosilicates (zeolites) have pores that are so small that many of the hydrocarbons cannot be adsorbed.

What is needed in the art is a lean burn $NO_x$ exhaust gas catalyst system having improved durability, as well as effective $NO_x$ management, over extended operating time. The present invention overcomes many of the shortcomings of the prior art.

SUMMARY OF THE INVENTION

Now, according to the present invention, a $NO_x$ catalyst has been developed comprising a mixture of multiple zeolite catalyst components. The $NO_x$ catalyst may comprise a mixture of five zeolite catalyst components including two hydrophilic zeolites and three hydrophobic zeolites.

DESCRIPTION OF PREFERRED EMBODIMENTS

A preferred embodiment of the present invention is a $NO_x$ catalyst wherein a first component comprises a $NO_2$ to $N_2$ conversion catalyst component comprising a first hydrophilic zeolite with a silica to alumina ratio of about 1 to 8, with about 3 to 5 being the preferred silica to alumina ratio. The zeolite can be any type, with X type zeolite and Y type zeolite being preferred; Y type zeolite is particularly preferred. The preferred ion exchanged element is barium, preferably at a level ranging from about 12 to about 28 wt %; about 18 wt % is particularly preferred. Additionally, a stabilizing agent may be added. Preferably, zirconium and/or phosphorus oxide, preferably at a level up to about 3 wt %, may be added as a stabilizing agent.

A second preferred component includes an $O_3$ conversion component comprising a second hydrophilic zeolite with a silica to alumina ratio of about 1 to about 8; a ratio of about 5 is preferred. The zeolite can be any type, with X type zeolite and Y type zeolite preferred; X type zeolite is particularly preferred. The preferred ion exchanged element is manganese, preferably at a level ranging from about 12 to about 31 wt %; about 18 wt % is particularly preferred. Additional stabilization with barium and/or calcium is preferred; up to about 2 wt % is particularly preferred. Further, zirconium and/or phosphorus oxide, preferably at a level up to about 3 wt %, may be added as a stabilizing agent.

A third preferred component includes a HC conversion component comprising a first hydrophobic zeolite with a silica to alumina ratio of about 25 to 80, about 25 is preferred. The zeolite can be any type, with Beta and ZSM-5 being preferred; ZSM-5 is particularly preferred. The preferred ion exchanged element is a transition metal, such as nickel, at a level ranging from about 0.1 to 2.0 wt %; at least about 1.0 wt % is preferred.

A fourth preferred component includes a $N_2O$ decomposition component comprising a second hydrophobic zeolite with a silica to alumina ratio of about 25 to about 80; a ratio of about 80 is preferred. The zeolite can be any type, with Beta and ZSM-5 being preferred; ZSM-5 is especially preferred. The preferred ion exchanged element can be copper, cobalt, rhodium, and/or palladium; the particularly preferred element is selected from rhodium, palladium, and mixtures thereof. Preferably, the ion exchanged element is utilized at a level ranging from about 0.1 to 1.0 wt %; at least about 0.2 wt % is preferred.

A fifth preferred component includes a VOC (volatile organic compounds) reducing component comprising a third hydrophobic zeolite with a silica to alumina ratio ranging from about 80 to about 280; a ratio of about 280 is preferred. The zeolite can be any type, with Beta and ZSM-5 being preferred; ZSM-5 is particularly preferred. The preferred ion exchanged element is copper, cobalt, and mixtures thereof; cobalt is particularly preferred. Preferably, the ion exchanged element is utilized at a level ranging from about 0.1 to 2.0 wt %; at least about 1.0 wt % is preferred.

Resistance to steam deactivation may be accomplished by inclusion of a large pore phosphates component. Silico-alumino-phosphate (SAPO), aluminophosphate (ALPO), and mixtures thereof are preferred. Aluminophosphate (ALPO) is particularly preferred. The phosphates can contain metal ions, such as silver, nickel, and mixtures thereof. Nickel is particularly preferred.

Further, a cleanup catalyst component may be included in about the last 20% of the catalyst near the exhaust exit (e.g., the last 2" of a 11" long monolith). This cleanup catalyst provides CO and HC oxidation. This component may be a zeolite with silica to alumina ratio of about 1 to about 8. A ratio of about 3 is preferred. The zeolite can be any type, with Beta and ZSM-5 being preferred; ZSM-5 is particularly preferred. The preferred ion exchanged element is platinum, palladium, and mixtures thereof. Palladium is particularly preferred.

The catalyst components may be mixed to form a mixture comprising about 50 to 75 wt % hydrophilic zeolites, and about 25 to 50 wt % hydrophobic zeolites. A preferred mixture comprises about 60 to 65% hydrophilic zeolites, about 30 to 35% hydrophobic zeolites, and about 10% or less hydrophobic phosphate zeolites. A particularly preferred mixture comprises about 60 wt % hydrophilic zeolites, about 30 wt % hydrophobic zeolites, and about 10 wt % phosphates.

Preferably, the hydrophilic zeolites comprise about 50 to about 75 wt % of the first hydrophilic zeolite and about 25 to about 50 wt % of the second hydrophilic zeolite. Particularly preferred is a mixture of about 50 wt % of the first hydrophilic zeolite and about 50 wt % of the second hydrophilic zeolite.

Preferably, the hydrophobic zeolites comprise about 25 to about 50 wt % of the first hydrophobic zeolite, about 25 to about 50 wt % of the second hydrophobic zeolite, and about 25 to about 50 wt % of the third hydrophobic zeolite. Particularly preferred is a mixture of about 33 ⅓ wt % of the first hydrophobic zeolite, about 33 ⅓ wt % of the second hydrophobic zeolite, and about 33 ⅓ wt % of the third hydrophobic zeolite.

A most preferred composition comprises about 40 wt % of the first hydrophilic zeolite, about 20 wt % of the second hydrophilic zeolite, about 10 wt % of the first hydrophobic zeolite, about 10 wt % of the second hydrophobic zeolite, about 10 wt % of the third hydrophobic zeolite, and about 10 wt % of the phosphates.

The following examples are provided to further describe the invention. The examples are intended to be illustrative in nature and are not to be construed as limiting the scope of the invention.

EXAMPLE I

Y-Zeolite with a silica to alumina ratio of 5 is mixed with a saturated barium-nitrate solution and heated to 80° C. for 4 hours. The solids are filtered then washed then calcined at 740° C. for 2 hours. The process is repeated at least 2 more times. The resulting material has barium occupying sites that had contained sodium. At least 18 wt % barium, and up to 28 wt %, barium is incorporated into the zeolite structure.

13X-Zeolite with a silica to alumina ratio of 5, is mixed with a saturated manganese-nitrate solution and heated to 80° C. for 4 hours. The solids are filtered then washed then calcined at 740° C. for 2 hours. The process is repeated at least 2 more times. The resulting material has manganese occupying sites that had contained sodium. At least 21 wt % manganese and up to 31 wt % manganese is incorporated into the zeolite structure.

ZSM-5 type zeolite support having a silica to alumina ratio of about 25 to about 80, (a ratio of about 25 is preferred) is mixed with an saturated nickel tetraamine solution and heated to 80° C. for 4 hours. The solids are filtered then washed then calcined at 700° C. for 2 hours. The resulting material has nickel occupying sites that had contained sodium. At least 0.1 wt % to about 2.0 wt % is incorporated into the zeolite structure.

ZSM-5 type zeolite support having a silica to alumina ratio of about 25 to about 80, (a ratio of about 80 is preferred) is mixed with an saturated palladium tetraamine solution and heated to 80° C. for 4 hours. The solids are filtered then washed then calcined at 700° C. for 2 hours. The resulting material has palladium occupying sites that had contained sodium. At least 0.1 wt % to about 1.0 wt % palladium is incorporated into the zeolite structure. At least 0.2 wt % palladium content is preferred.

ZSM-5 type zeolite support having a silica to alumina ratio of about 80 to about 280, (a ratio of about 280 is preferred) is mixed with an saturated cobalt tetraamine solution and heated to 80° C. for 4 hours. The solids are filtered then washed then calcined at 700° C. for 2 hours. The resulting material has cobalt occupying sites that had contained sodium. At least 0.1 wt % to about 2.0 wt % cobalt is incorporated into the zeolite structure. At least 1.0 wt % cobalt content is preferred.

A slurry is made from 1500 grams water, 400 grams barium Y-zeolite, 200 grams manganese X-zeolite, 110 grams nickel-ZSM-5, 110 grams palladium-ZSM-5, 110 grams cobalt-ZSM-5 and 100 grams VPI-5 aluminophosphate. The slurry is coated on a 600 cell/in$^3$ cordierite monolith and calcined to 500° C. for 4 hours. The calcined washcoat weight is targeted to 4.0 g/in$^3$.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A multiple zeolite catalyst mixture for purifying exhaust gases form an internal combustion engine, comprising:
   a first $NO_2$ to $N_2$ conversion catalyst component comprising a first hydrophilic zeolite;
   a second $O_3$ conversion catalyst component comprising a zeolite;
   a third HC conversion catalyst component, comprising a first hydrophobic zeolite;
   a fourth $N_2O$ decomposition catalyst component comprising a zeolite; and,
   a fifth VOC reduction catalyst component comprising a zeolite;
   wherein the catalyst mixture comprises about 50 to 75 weight percent of the first and second catalyst components, and about 25 to 50 weight percent of the third, fourth, and fifth catalyst components.

2. The catalyst mixture of claim 1 wherein the first hydrophilic zeolite further comprises a silicon to alumina ratio ranging from about 1 to 8.

3. The catalyst mixture of claim 2 wherein the first hydrophilic zeolite is selected from the group consisting of X type zeolite and Y type zeolite.

4. The catalyst mixture of claim 2 having a barium ion exchange element at a level ranging from about 12 to 28 weight percent.

5. The catalyst mixture of claim 1 wherein the first catalyst component includes a stabilizing agent selected from the group consisting of zirconium oxide, barium oxide, and mixtures thereof.

6. The catalyst mixture of claim 5 wherein the stabilizing agent is added at a level ranging up to about 3 weight percent.

7. The catalyst mixture of claim 1 wherein the second catalyst component comprises a second hydrophilic zeolite with a silica to alumina ratio ranging from about 1 to 8.

8. The catalyst mixture of claim 7 wherein the second catalyst component is a hydrophilic zeolite selected from the group consisting of Y type zeolite and X type zeolite.

9. The catalyst mixture of claim 7 having a manganese ion exchanged element at a level of about 12 to 31 weight percent.

10. The catalyst mixture of claim 7 wherein the second catalyst component includes a stabilization element selected from the group consisting of Ba, Ca, and mixture thereof, at a level up to about 2 weight percent.

11. The catalyst mixture of claim 7 wherein the second catalyst component includes a stabilizing agent selected from the group consisting of zirconium oxide, phosphorus oxide, and mixture thereof, at a level up to about 3 weight percent.

12. The catalyst mixture of claim 1 wherein the first hydrophobic zeolite further comprises a silica to alumina ratio ranging from about 25 to 80.

13. The catalyst mixture of claim 12 wherein the first hydrophobic zeolite is selected from the group consisting of Beta zeolite and ZSM-5 zeolite.

14. The catalyst mixture of claim 12 wherein the third catalyst component includes a transition metal ion exchanged element at a level ranging from about 0.1 to 2.0 weight percent.

15. The catalyst mixture of claim 1 wherein the fourth catalyst component comprises a second hydrophobic zeolite with a silica to alumina ratio ranging from about 25 to 80.

16. The catalyst mixture of claim 15 wherein the second hydrophobic zeolite is selected from Beta zeolite and ZSM-5 zeolite.

17. The catalyst mixture of claim 16 wherein the second hydrophobic zeolite has an ion exchanged element selected from the group consisting of copper, cobalt, rhodium, palladium, and mixtures thereof, at a level ranging from about 0.1 to 1.0 weight percent.

18. The catalyst mixture of claim 1 wherein the fifth component comprises a third hydrophobic zeolite with a silica to alumina ratio ranging from about 80 to 280.

19. The catalyst mixture of claim 18 wherein the third hydrophobic zeolite is selected from the group consisting of Beta zeolite and ZSM-5.

20. The catalyst mixture of claim 18 wherein the third hydrophobic zeolite has an ion exchanged element selected from the group consisting of copper, cobalt, and mixtures thereof, at a level ranging from about 0.1 to 2.0 weight percent.

21. The catalyst mixture of claim 1 including a phosphate component selected from group consisting of silica-alumina phosphate, aluminophosphate, and mixtures thereof.

22. The catalyst mixture of claim 1 including a cleanup catalyst component comprising a zeolite, selected from the group consisting of Beta zeolite and ZSM-5 zeolite, having a silica to alumina ratio ranging from about 1 to 8, and having an ion exchanged element selected from palladium, platinum, and mixtures thereof.

23. The catalyst mixture of claim 1 comprising about 60 to 65 weight percent of the first and second catalyst components, and about 30 to 35 weight percent of the third, fourth, and fifth catalyst components.

24. The catalyst mixture of claim 23 comprising about 60 weight percent of the first and second catalyst components, about 30 weight percent of the third, fourth, and fifth catalyst components, and about 10 weight percent of a phosphate component.

25. The catalyst mixture of claim 24 wherein the first and second catalyst components comprise about 50 to 75 percent of the first catalyst component and about 25 to 50 percent of the second catalyst component.

26. The catalyst mixture of claim 25 comprising about 40 weight percent of the catalyst component, about 20 weight percent of the second catalyst component, about 10 weight percent of the third catalyst component, about 10 weight percent of the fourth catalyst component, about 10 weight percent of the fifth catalyst component, and about 10 weight percent of the phosphate component.

27. The catalyst mixture of claim 24 wherein the third, fourth, and fifth catalyst components comprise about 25 to 50 percent of the third catalyst component, about 25 to 50 percent of the fourth catalyst component, and about 25 to 50 percent of the fifth catalyst component.

28. A multiple zeolite catalyst mixture comprising:
a first catalyst component comprising a Y type hydrophilic zeolite with a silica to alumina ratio ranging from about 1 to 8, and having a barium ion exchanged element at a level ranging from about 12 to 28 weight percent;
a second catalyst component comprising a X type hydrophilic zeolite with a silica to alumina ratio ranging from about 1 to 8, and having a manganse ion exchanged element at a level ranging from about 12 to 25 weight percent;
a third catalyst component comprising a ZSM-5 hydrophobic zeolite with a silica to alumina ratio ranging from about 25 to 80, and having a nickel ion exchanged element at a level ranging from about 0.1 to 1.0;
a fourth catalyst component comprising a ZSM-5 hydrophobic zeolite with a silica to alumina ratio ranging from about 25 to 80, and having an ion exchanged element selected from rhodium, palladium, and mixtures thereof at a level ranging from about 0.1 to 1.0 weight percent; and
a fifth catalyst component comprising a ZSM-5 hydrophobic zeolite with a silica to alumina ratio ranging from about 80 to 280, and having a cobalt ion exchanged element at a level ranging from about 0.1 to 2.0 weight percent.

29. The catalyst mixture of claim 28 comprising about 40 weight percent of the first catalyst component, about 20 weight percent of the second catalyst component, about 10 weight percent of the third catalyst component, about 10 weight percent of the fourth catalyst component, about 10 weight percent of the fifth catalyst component, and about 10 weight percent of a phosphate component.

30. A multiple zeolite catalyst mixture for purifying exhaust gases from an internal combustion engine, comprising:
a first $NO_2$ to $N_2$ conversion catalyst component comprising a first hydrophilic zeolite;
a second $O_3$ conversion catalyst component comprising a second hydrophilic zeolite;
a third HC conversion catalyst component comprising a first hydrophobic zeolite;
a fourth $N_2O$ decomposition catalyst component comprising a second hydrophobic zeolite; and,
a fifth VOC reduction catalyst component comprising a third hydrophobic zeolite;
wherein the catalyst mixture comprises about 50 to 75 weight percent of the first and second catalyst components, and about 25 to 50 weight percent of the third, fourth, and fifth catalyst components.

31. The catalyst mixture of claim 30, wherein:
the first catalyst component further comprises a silica to alumina ratio ranging from about 1 to 8;
the second catalyst component further comprises a silica to alumina ratio ranging from about 1 to 8;
the third catalyst component further comprises a silica to alumina ratio ranging from about 25 to 80;
the fourth catalyst component further comprises a silica to alumina ratio ranging from about 25 to 80; and
the fifth catalyst component further comprises a silica to alumina ratio ranging from about 80 to 280.

32. The catalyst mixture of claim 31, wherein the first catalyst component silica to alumina ratio ranges from about 3 to 5.

* * * * *